Oct. 20, 1953 J. S. COLDWELL 2,656,220
WHEEL HAVING CUSHIONED TREAD
Filed May 26, 1950

INVENTOR.
JOHN S. COLDWELL
BY
John W. Michael
ATTORNEY

Patented Oct. 20, 1953

2,656,220

UNITED STATES PATENT OFFICE 2,656,220

WHEEL HAVING CUSHIONED TREAD

John S. Coldwell, Milwaukee, Wis., assignor to Globe-Union Inc., Milwaukee, Wis., a corporation of Wisconsin Application May 26, 1950, Serial No. 164,560

1 Claim. (Cl. 301—5.7)

This invention relates to improvements in wheels and particularly to roller-skate wheels which have cushioning material between the metal tread and supporting bearing.

It is desirable to cushion the metal tread in order to lengthen the usable life thereof, to deaden operational noises, and to lessen the transmission of tiring vibrations to the skater. A difficulty exists in cushioning the tread so that these good effects may be obtained without the tread having an undesirable amount of lateral deflection with respect to the bearing.

It is an object of this invention, therefore, to cushion the tread of a roller-skate wheel from the bearing in a manner obtaining the above mentioned good effects without permitting the tread to have undesirable lateral deflection.

Another object of this invention is to provide a roller-skate wheel with an effective cushioned tread which is of simple and inexpensive construction.

These objects are realized by the interposition of a cushion extending between the tread and the outer race of the bearing. Such cushion has a maximum volume of elastic material commensurate with the size of the wheel. To obtain such volume the outer race is a section of seamless tubing pressed into an opening in the cushion. This provides a relatively thin wall of metal between the balls of the bearing and the cushion. The cushion is substantially as thick as the length of such race and extends radially to the inner surface of the tread. The tread is held to the cushion by inturned flanges which grip the sides of the cushion. The balls and cone or hub are retained within the outer race by discs mounted on opposite sides of the cushion and held by rivets. This construction permits the cushion to have a maximum axial thickness as well as radial depth. Thus there is sufficient volume of material in the cushion to allow enough relative radial movement between tread and bearing to deaden vibrational noises and absorb tiring vibration. The discs in addition to retaining the balls and cone and receiving axial thrust also offer lateral support to the cushion and prevent undue lateral displacement thereof thus keeping the wheel from canting.

The novel features, which are considered characteristic of the invention, are set forth with particularity in the appended claim. The invention itself, however, both as to its organization and its method of operation, together with additional objects and advantages thereof, will best be understood from the following description of a specific embodiment when read in connection with the accompanying drawing, in which:

Figure 1:
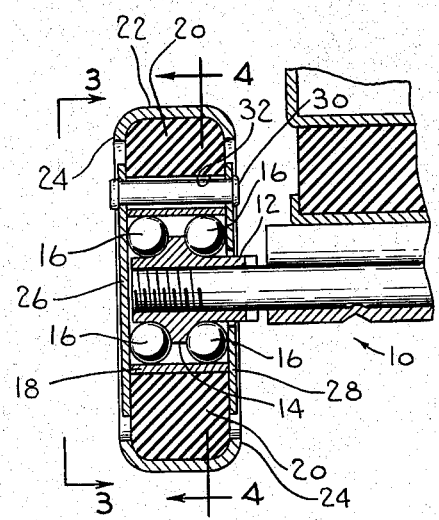
Fig. 1 is a diametric sectional view of a roller-skate wheel embodying the present invention.
Figure 3:
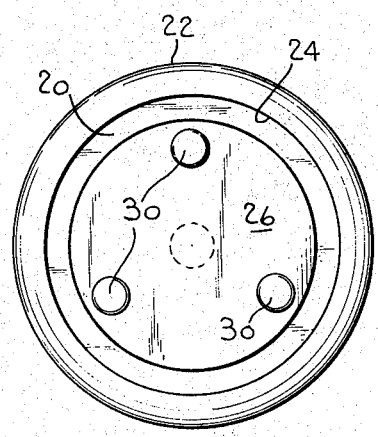
Fig. 3 is a side elevation taken from the line 3—3 of Fig. 1.
Figure 4:
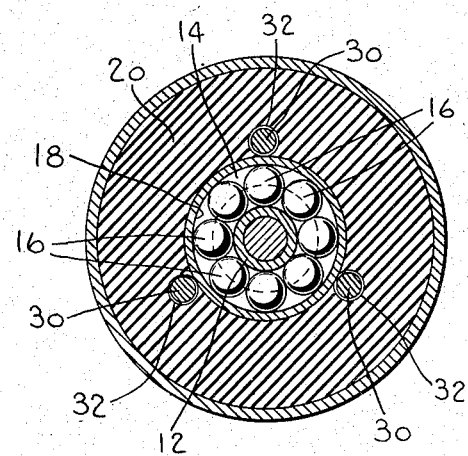
Fig. 4 is a sectional view taken on the line 4—4 of Fig. 1.

Referring to the drawing by reference numerals, the invention is embodied in a roller-skate wheel which is mounted on a conventional truck and axle assembly indicated generally at 10. The wheel has a hub or cone 12 which in the modification shown in Figs. 1, 3, and 4 is threadedly secured to the axle of the assembly. An annular flange or internal thrust member 14 surrounds the cone 12 and cooperates therewith in forming the inner race for a bearing with a double row of balls 16. An outer race 18 of tubular or hollow cylindrical shape, which may be made from sections of seamless tubing, encircles the balls 16. An essential characteristic of the outer race is that the outer cylindrical surface thereof is spaced from the interior ball-engaging surface thereof by a relatively thin wall or section. This feature conserves space which provides more room for the cushioning material hereinafter described. The outer race 18 is snugly fitted within a central opening in an annular ring or cushion 20. This ring is made of rubber or other resilient material and has a thickness substantially equal to the length of the outer race 18, thus utilizing to the fullest extent the bearing width provided by such race. A metal tread 22 surrounds and engages the peripheral surface of the cushion 20 and is secured to such cushion by annular flanges 24 turned inwardly against the marginal edges of the sides of such cushion. This arrangement permits the volume of the resilient material in the ring or cushion 20 to be materially increased, without change to wheel size, with the consequent result of providing more radial movement between the tread 22 and the bearing to increase the deadening action of vibrational noises and more completely absorb tiring vibrations resulting from operation.

An outer disc 26 and an inner apertured disc 28 are secured to opposite sides of the cushion 20 to retain the balls 16 and cone 12 in proper assembly and receive the axial or lateral thrust forces, thus keeping the outer race 18 in proper alinement with the cone and preventing canting thereof. In addition to the foregoing functions such plates also extend over sufficient area of such sides to provide lateral support for the cushion and prevent undue lateral displacement thereof. This keeps the tread 22 from unduly canting or tilting with respect to the outer race 18 and the wheel will run true even when subject to lateral thrust. The plates may be held in the position shown by rivets 30 or other fasteners extending from one plate to the other through openings 32 in the cushion 20. The aperture of the inner plate lets an end of the cone 12 project from one side of the wheel to provide a holding part by which such cone may be threaded on the axle.

Figure 2:
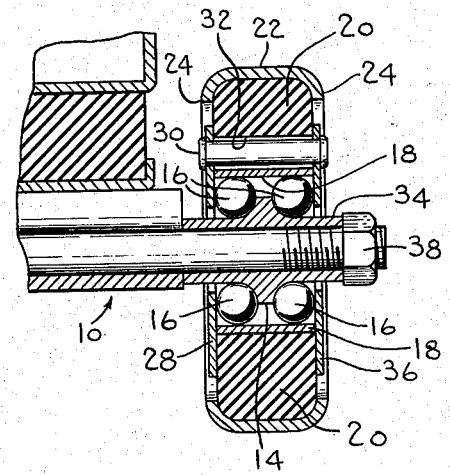
Fig. 2 is a diametric sectional view of a roller-skate wheel embodying the invention and having an alternative form of bearing cone.

In the alternative form shown in Fig. 2, the cone 34 has both ends projecting beyond the lateral confines of the wheel, and the outer disc 36 as well as the inner disc 28 has an opening therethrough so that both ends of the cone may project therethrough. With this construction the cone may be slid on the axle and secured by a nut 38 in the conventional manner.

One way of assembling either of the wheels herein described consists in first making a sub-assembly consisting of the cushion 20 with the tread 22 assembled on the outside thereof and the cylindrical member 18 pressed into the central opening thereof. The cone 12 is then placed within the outer race 18 with one end up and the proper number of balls dropped in place. A retaining plate is temporarily positioned over such balls and the unit inverted. The proper number of balls is then placed on the opposite side of the flange 14 and the other retaining plate put in position. Both plates are then permanently secured by passing the rivets therethrough and riveting over the ends thereof.

Although only one embodiment of the invention is shown and described herein, it will be understoood that this application is intended to cover such changes or modifications as come within the spirit of the invention or scope of the following claim.

I claim:

A wheel comprising a hub providing an inner race for an anti-friction bearing, a cylindrical member comprising an outer race, balls between said hub and said cylindrical member to mount the same for coaxial relative rotation, an annular resilient cushion ring having a thickness substantially equal to the length of said cylindrical member mounted thereabout, a metal tread mounted on the periphery of said ring, said ring being radially compressible by said tread in normal usage to increase deadening action of vibrational noises and more completely absorb tiring operational vibrations, plates positioned on the sides of said ring and extending over the ends of said cylindrical member to directly engage said balls and receive axial thrust forces therefrom, said plates extending toward but spaced from said metal tread to provide lateral support for said ring and fastening members secured to such plates and passing through said ring to hold said plates in place.

JOHN S. COLDWELL.

References Cited in the file of this patent
UNITED STATES PATENTS

| Number | Name | Date |
|---|---|---|
| 322,611 | Jones | July 21, 1885 |
| 343,185 | Mendenhall | June 8, 1886 |
| 1,448,152 | Ricke | Mar. 13, 1923 |
| 1,536,337 | Gibson | May 5, 1925 |
| 1,566,699 | Larsen | Dec. 22, 1925 |
| 2,291,600 | Atkinson | Aug. 4, 1942 |
| 2,467,437 | Martinec | Apr. 19, 1949 |